US009025526B2

(12) United States Patent
Hapsari et al.

(10) Patent No.: US 9,025,526 B2
(45) Date of Patent: May 5, 2015

(54) MOBILE STATION AND RADIO BASE STATION

(75) Inventors: Wuri Andarmawanti Hapsari, Tokyo (JP); Mikio Iwamura, Tokyo (JP); Itsuma Tanaka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/704,474

(22) PCT Filed: Jun. 13, 2011

(86) PCT No.: PCT/JP2011/063478
§ 371 (c)(1),
(2), (4) Date: Mar. 1, 2013

(87) PCT Pub. No.: WO2011/158779
PCT Pub. Date: Dec. 22, 2011

(65) Prior Publication Data
US 2013/0155951 A1      Jun. 20, 2013

(30) Foreign Application Priority Data

Jun. 14, 2010    (JP) ............................... P2010-135443

(51) Int. Cl.
H04W 4/00        (2009.01)
H04W 76/00       (2009.01)
H04W 48/02       (2009.01)

(52) U.S. Cl.
CPC .............. *H04W 76/00* (2013.01); *H04W 48/02* (2013.01)

(58) Field of Classification Search
None
See application file for complete search history.

(56) References Cited

U.S. PATENT DOCUMENTS

2006/0286984 A1* 12/2006 Bonner ........................ 455/445
2010/0195616 A1* 8/2010 Vikberg et al. ............... 370/331

OTHER PUBLICATIONS

International Search Report issued in PCT/JP2011/063478 mailed Aug. 30, 2011 (3 pages).
Written Opinion issued in PCT/JP2011/063478 mailed Aug. 30, 2011 (3 pages).
NTT Docomo, et al.; "Access control for CSFB"; 3GPP TSG-SA WG1 Meeting #50, S1-101221; Venice, Italia, EU; May 10-14, 2010 (3 pages).
3GPP TS 22.011 V9.3.0; "3rd Generation Partnership Project; Technical Specification Group Services and System Aspects; Service accessibility (Release 9)"; Dec. 2009 (23 pages).
NTT Docomo, Inc.; "AC-Barring for Mobile Originating CSFB call"; 3GPP TSG-RAN2#76bis, R2-103866; Stockholm, Sweden; Jun. 28-Jul. 2, 2010 (4 pages).
NTT Docomo, Inc.; "AC-Barring for Mobile Originating CSFB calls"; 3GPP TSG-RAN2 Meeting #70bis, R2-103867; Stockholm, Sweden; Jun. 28-Jul. 2, 2010 (12 pages).
Japanese Office Action in corresponding Japanese Application No. 2010-135443 mailed Aug. 30, 2011 (6 pages).
(Continued)

*Primary Examiner* — Anez Ebrahim
(74) *Attorney, Agent, or Firm* — Osha Liang LLP (57) ABSTRACT

A mobile station UE according to the present invention includes a notification reception unit 21 configured to receive an SIB2 in E-UTRAN and a barring processor unit 22 configured to perform predetermined barring processing in E-UTRAN based on information elements included in the SIB2. The barring processor unit 22 is configured to perform barring processing for origination of a CS call using a CSFB function based on "ac-BarringForCSFB-r10" and "ac-BarringForMO-Data" among the information elements.

2 Claims, 4 Drawing Sheets

(56) References Cited

OTHER PUBLICATIONS

3GPP TS 36.331 V8.9.0; "3rd Generation Partnership Project; Technical Specification Group Radio Access Network; Evolved Universal Terrestrial Radio Access (E-UTRA); Radio Resource Control (RRC); Protocol specification (Release 8)"; Mar. 2010 (211 pages).

Office Action in counterpart Canadian Patent Application No. 2,802,640 issued on Jul. 3, 2014 (3 pages).

Extended European Search Report in the counterpart European Patent application No. 11795685.4 issued on Nov. 14, 2013 (5 pages).

NTT Docomo, Inc; "AC-Barring for Mobile Originating CSFB calls"; 3GPP TSG-RAN2 Meeting #69bis, R2-102503; Beijing, China; Apr. 12-Apr. 16, 2010 (11 pages).

Office Action in counterpart Chilean Patent Application No. 3525-2012 issued Aug. 5, 2014 (10 pages).

Office Action in counterpart Chinese Patent Application No. 201180029304.5 issued on Feb. 19, 2014 (9 pages).

Office Action in counterpart European Patent Application No. 11 795 685.4 issued on Sep. 16, 2014 (4 pages).

* cited by examiner

*SystemInformationBlockType2information element*

```
-- ASN1START

SystemInformationBlockType2 ::=      SEQUENCE {
    ac-BarringInfo                       SEQUENCE {
        ac-BarringForEmergency               BOOLEAN,
        ac-BarringForMO-Signalling           AC-BarringConfig              OPTIONAL,
        ac-BarringForMO-Data                 AC-BarringConfig              OPTIONAL,     -- Need OP
    }                                                                      OPTIONAL,     -- Need OP
    radioResourceConfigCommon            RadioResourceConfigCommonSIB,
    ue-TimersAndConstants                UE-TimersAndConstants,
    freqInfo                             SEQUENCE {
        ul-CarrierFreq                       ARFCN-ValueEUTRA              OPTIONAL,     -- Need OP
        ul-Bandwidth                         ENUMERATED {n6, n15, n25, n50, n75, n100}
                                                                           OPTIONAL,     -- Need OP
        additionalSpectrumEmission           AdditionalSpectrumEmission
    },
    mbsfn-SubframeConfigList             MBSFN-SubframeConfigList          OPTIONAL,     -- Need OR
    timeAlignmentTimerCommon             TimeAlignmentTimer,
    ...,
    lateR8NonCriticalExtension       OCTET STRING                          OPTIONAL,     -- Need OP
    [[ ssac-BarringForMMTEL-Voice-r9     AC-BarringConfig                  OPTIONAL,     -- Need OP
       ssac-BarringForMMTEL-Video-r9     AC-BarringConfig                  OPTIONAL      -- Need OP
    ]]
    ac-BarringForCSFB-r10                AC-BarringForCSFB-r10             OPTIONAL,     -- Need OP
    ]]
}
AC-BarringForCSFB-r10 ::=            CHOICE{
    barring                              AC-BarringConfig,
    no-Barring                           Null
}
AC-BarringConfig ::=                 SEQUENCE {
    ac-BarringFactor                     ENUMERATED {
                                             p00, p05, p10, p15, p20, p25, p30, p40,
                                             p50, p60, p70, p75, p80, p85, p90, p95 },
    ac-BarringTime                       ENUMERATED {s4, s8, s16, s32, s64, s128, s256, s512},
    ac-BarringForSpecialAC               BIT STRING (SIZE(5))
}

MBSFN-SubframeConfigList ::=         SEQUENCE (SIZE (1..maxMBSFN-Allocations)) OF MBSFN-
SubframeConfig

-- ASN1STOP
```

| *SystemInformationBlockType2* field descriptions |
|---|
| *ac-BarringForEmergency*<br>Access class barring for AC 10. |
| *ac-BarringForMO-Signalling*<br>Access class barring for mobile originating signalling. |
| *ac-BarringForMO-Data*<br>Access class barring for mobile originating calls. |
| *ac-BarringFactor*<br>If the random number drawn by the UE is lower than this value, access is allowed. Otherwise the access is barred. The values are interpreted in the range [0,1]: p00 = 0, p05 = 0.05, p10 = 0.10,...,p95 = 0.95. |
| *ac-BarringTime*<br>Mean access barring time value in seconds. |
| *ac-BarringForSpecialAC*<br>Access class barring for AC 11-15. The first/ leftmost bit is for AC 11, the second bit is for AC 12, and so on. |
| *ul-CarrierFreq*<br>For FDD: If absent, the (default) value determined from the default TX-RX frequency separation defined in TS 36.101 [42, table 5.7.3-1] applies.<br>For TDD: This parameter is absent and it is equal to the downlink frequency. |
| *ul-Bandwidth*<br>Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. |
| *mbsfn-SubframeConfigList*<br>Defines the subframes that are reserved for MBSFN in downlink. |
| *ssac-BarringForMMTEL-Voice*<br>Service specific access class barring for MMTEL voice originating calls. |
| *ssac-BarringForMMTEL-Video*<br>Service specific access class barring for MMTEL video originating calls. |
| *ac-BarringForCSFB*<br>Access class barring information for mobile originating CS fallback calls. |
| *no- Barring*<br>Indicates that there is no access class barring applicable for mobile originating CS fallback calls. |

FIG. 4

SystemInformationBlockType2 information element

```
-- ASN1START

SystemInformationBlockType2 ::=     SEQUENCE {
    ac-BarringInfo                      SEQUENCE {
        ac-BarringForEmergency              BOOLEAN,
        ac-BarringForMO-Signalling          AC-BarringConfig            OPTIONAL,     -- Need OP
        ac-BarringForMO-Data                AC-BarringConfig            OPTIONAL,     -- Need OP
    }
    radioResourceConfigCommon           RadioResourceConfigCommonSIB,
    ue-TimersAndConstants               UE-TimersAndConstants,
    freqInfo                            SEQUENCE {
        ul-CarrierFreq                      ARFCN-ValueEUTRA            OPTIONAL,     -- Need OP
        ul-Bandwidth                        ENUMERATED {n6, n15, n25, n50, n75, n100}
                                                                        OPTIONAL,     -- Need OP
        additionalSpectrumEmission          AdditionalSpectrumEmission
    },
    mbsfn-SubframeConfigList            MBSFN-SubframeConfigList        OPTIONAL,     -- Need OR
    timeAlignmentTimerCommon            TimeAlignmentTimer,
    ...,
    lateR8NonCriticalExtension          OCTET STRING                    OPTIONAL,     -- Need OP
    [[  ssac-BarringForMMTEL-Voice-r9      AC-BarringConfig             OPTIONAL,     -- Need OP
        ssac-BarringForMMTEL-Video-r9      AC-BarringConfig             OPTIONAL      -- Need OP
    ]]
    ac-BarringForCSFB-r10               AC-BarringForCSFB-r10           OPTIONAL,     -- Need OP
    ]]
}
AC-BarringForCSFB-r10 ::=            CHOICE{
    arbing                              AC-BarringConfig,               OPTIONAL      -- Need OP
}
AC-BarringConfig ::=                 SEQUENCE {
    ac-BarringFactor                    ENUMERATED {
                                            p00, p05, p10, p15, p20, p25, p30, p40,
                                            p50, p60, p70, p75, p80, p85, p90, p95 },
    ac-BarringTime                      ENUMERATED {s4, s8, s16, s32, s64, s128, s256, s512},
    ac-BarringForSpecialAC              BIT STRING (SIZE(5))
}

MBSFN-SubframeConfigList ::=         SEQUENCE (SIZE (1..maxMBSFN-Allocations)) OF MBSFN-
SubframeConfig

-- ASN1STOP
```

MOBILE STATION AND RADIO BASE STATION

TECHNICAL FIELD

The present invention relates to a mobile station and a radio base station.

BACKGROUND ART

In LTE (Long Term Evolution) Release-8/9, a radio base station eNB is configured to bar origination of an emergency call, a signaling call and a normal packet switching (PS) call respectively by transmitting "ac-BarringForEmergency", "ac-BarringForMO-Signalling", and "ac-BarringForMO-Data" through an SIB (System Information Block) 2.

PRIOR ART DOCUMENT

Non-Patent Document

Non-Patent Document 1: TS 36.331 Technical Specification Group Radio Access Network; Evolved Universal Terrestrial Radio Access (E-UTRA) Radio Resource Control (RRC); Protocol specification

SUMMARY OF THE INVENTION

Problem to be Solved by the Invention

However, there has been a problem that LTE Release-8/9 does not support barring origination of a circuit switching (CS) call using a CSFB (Circuit Switching Fallback) function.

Specifically, like the origination of the normal PS call, the origination of the CS call using the CSFB function is performed through E-UTRAN (Evolved Universal Terrestrial Radio Access Network). However, the CS call is not classified as a PS domain but is classified as a CS domain. Thus, even when SSAC (Service Specific Access Control) is employed in a certain cell, a mobile station UE can originate the CS call using the CSFB function.

Accordingly, the present invention is made in view of the above problem, and an objective of the present invention is to provide a mobile station and a radio base station that can appropriately bar origination of a CS call using a CSFB function.

Means for Solving the Problem

The first feature of the present invention is summarized in that mobile station configured to be capable of performing circuit switching communications using a circuit switching fallback function through a second radio access network that supports packet switching and circuit switching while the mobile station is in a first radio access network that supports the packet switching but does not support the circuit switching, the mobile station including a notification reception unit configured to receive notification in the first radio access network, and a barring processor unit configured to perform predetermined barring processing in the first radio access network based on information elements included in the notification, wherein the barring processor unit is configured to perform barring processing for origination of a circuit switching call using the circuit switching fallback function based on a first information element for barring an origination of a circuit switching call using the circuit switching fallback function and a second information element for barring an origination of a normal packet switching call among the information elements.

The second feature of the present invention is summarized in that a radio base station in a first radio access network that supports packet switching but does not support circuit switching in a mobile communication system configured such that a mobile station in the first radio access network is capable of performing circuit switching communications using a circuit switching fallback function through a second radio access network that supports the packet switching and the circuit switching, the radio base station including a notification transmission unit configured to transmit notification, wherein the notification transmission unit is configured to include in the notification, an information element for barring an origination of an emergency call, an information element for barring an origination of a signaling call, and information element for barring an origination of a normal packet switching call, as information elements receivable by a mobile station supporting a first release, and the notification transmission unit is configured to include, in the notification, an information element for barring a circuit switching call using the circuit switching fallback function as an information element receivable by a mobile station supporting a second release newer than the first release.

Effect of the Invention

As described above, the present invention can provide a mobile station and a radio base station that can appropriately bar origination of a CS call using a CSFB function.

BRIEF DESCRIPTION OF DRAWINGS

FIG. 3 is diagram showing an example of a format of an SIB2 transmitted in the mobile communication system according to the first embodiment.

MODE FOR CARRYING OUT THE INVENTION

Mobile Communication System according to First Embodiment of the Present Invention A mobile communication system according to a first embodiment of the present invention is described with reference to FIG. 1 to FIG. 6.

In the mobile communication system according to this embodiment, a radio base station eNB that can support LTE Release-10 (second release) as well as LTE Release-8/9 (first release), is provided.

Figure 1:
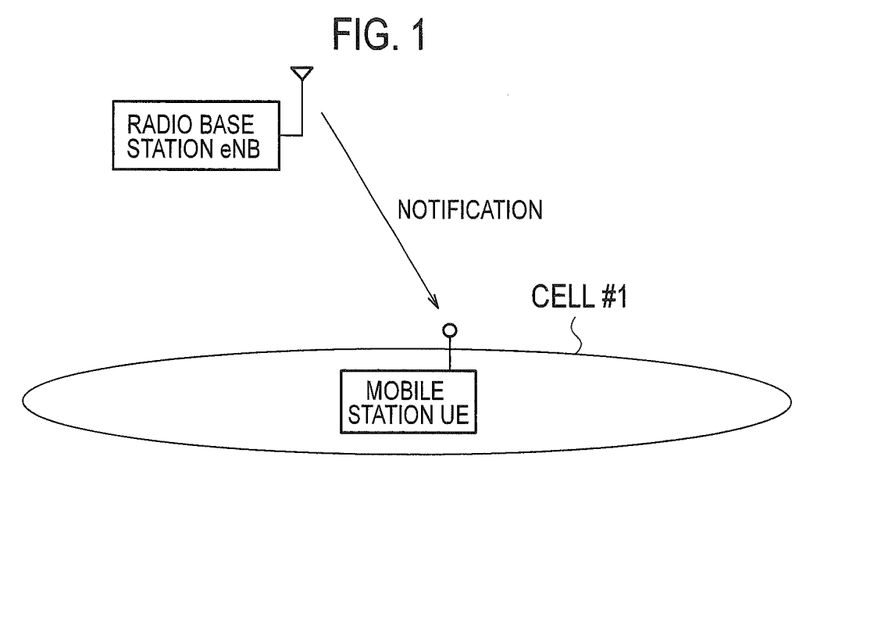
FIG. 1 is an overall configurational view of a mobile communication system according to a first embodiment of the present invention.

The configuration of an example shown in FIG. 1 is as follows. The radio base station eNB transmits notification in a cell #1 formed by the radio base station eNB, and a mobile station UE in the cell #1 receives the notification.

Figure 2:
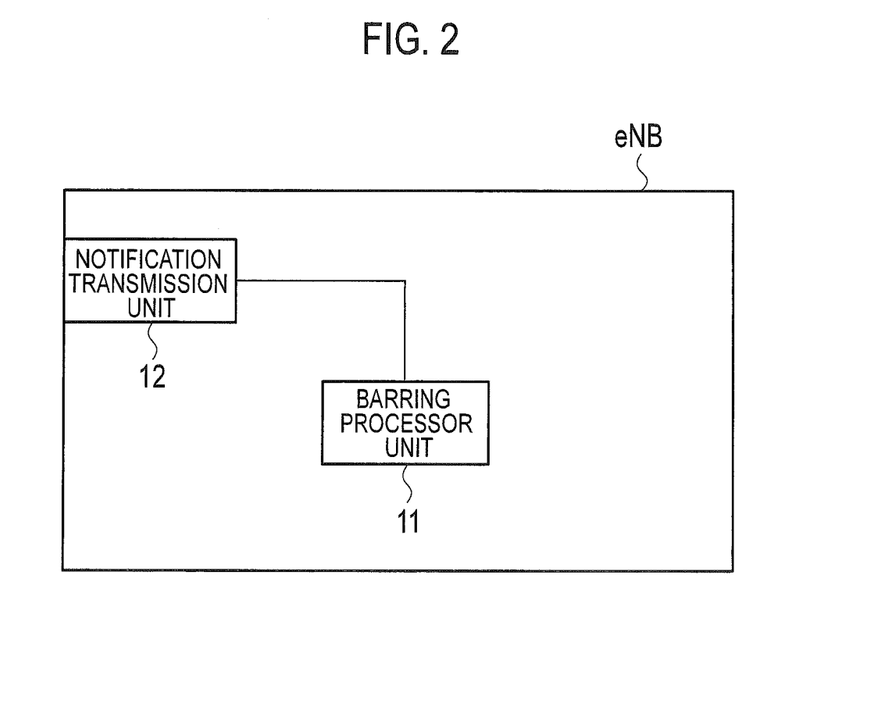
FIG. 2 is a functional block diagram of a radio base station according to the first embodiment of the present invention.

As shown in FIG. 2, the radio base station eNB includes a barring processor unit 11 and a notification transmission unit 12.

The barring processor unit 11 is configured to perform barring processing in the cell formed by the radio base station eNB.

Specifically, the barring processor unit 11 is configured to bar origination of an emergency call, a signaling call, a normal PS call, and a CS call using a CSFB function, upon, for example, being instructed by an operator or when a predetermined condition is satisfied.

The notification transmission unit 12 is configured to transmit notification such as an MIB (Master Information Block) and an SIB in the cell formed by the radio base station eNB.

FIG. 3 shows an example of an information element in an SIB2 as one type of the notification.

As shown in FIG. 3, the notification transmission unit 12 is configured to be capable of including in the SIB2, "ac-BarringForEmergency", "ac-BarringForMO-Signalling", and "ac-BarringForMO-Data" as information elements receivable by the mobile station UE supporting LTE Release-8/9, in accordance with an instruction from the barring processor unit 11.

Here, "ac-BarringForEmergency" is an information element for barring the origination of the emergency call, "ac-BarringForMO-Signalling" is an information element for barring the origination of the signaling call, and "ac-BarringForMO-Data" is an information element for barring the origination of the normal PS call.

As shown in FIG. 3, "AC-BarringConfig" is settable in "ac-BarringForMO-Signalling" and "ac-BarringForMO-Data", and "ac-BarringFactor", "ac-BarringTime", and "ac-BarringForSpecialAC" are settable in "AC-BarringConfig".

A value equal to or larger than 0 and smaller than 1 is settable in "ac-BarringFactor", an average access barring time on the second time scale is settable in "ac-BarringTime", and information indicating whether the access is barred for AC (access classes) 11 to 15 can be set in "ac-BarringForSpecialAC".

The notification transmission unit 12 is configured to be capable of including in the SIB2, "ac-BarringForCSFB-r10" as an information element receivable by the mobile station UE that can support LTE Release-10.

Here, "ac-BarringForCSFB-r10" is an information element for barring the CS call using the CSFB function.

As shown in FIG. 3, "AC-BarringForCSFB-r10" is settable in "ac-BarringForCSFB-r10" and "barring" with which "AC-BarringConfig" is settable or "no-barring" with which nothing is set is settable in "AC-BarringForCSFB-r10".

Figure 4:
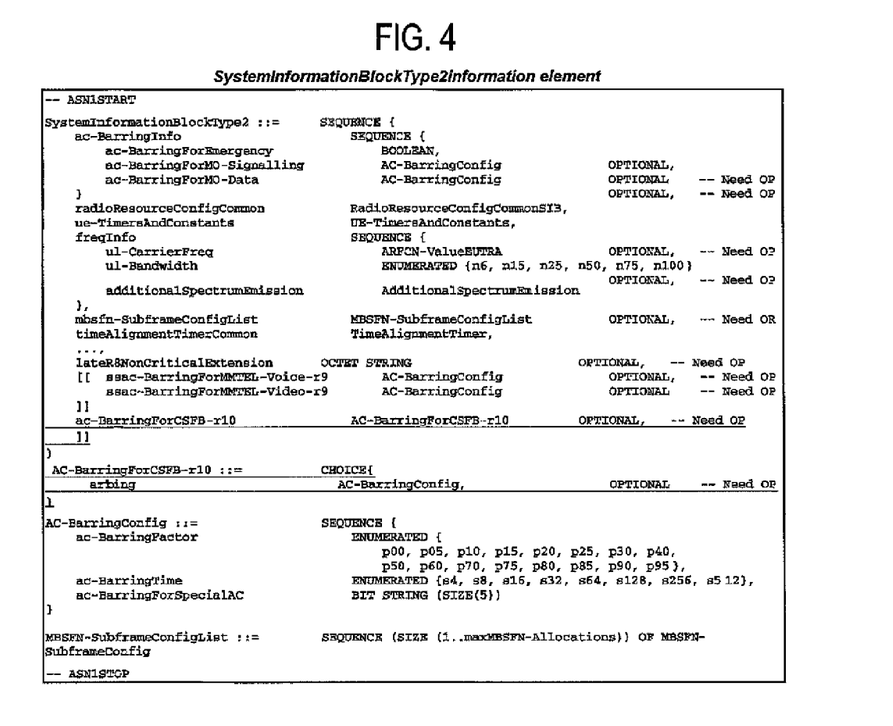
FIG. 4 is diagram showing an example of a format of the SIB2 transmitted in the mobile communication system according to the first embodiment.

Alternatively, only "barring" as described above may be settable in "AC-BarringForCSFB-r10" as shown in FIG. 4.

Figure 5:
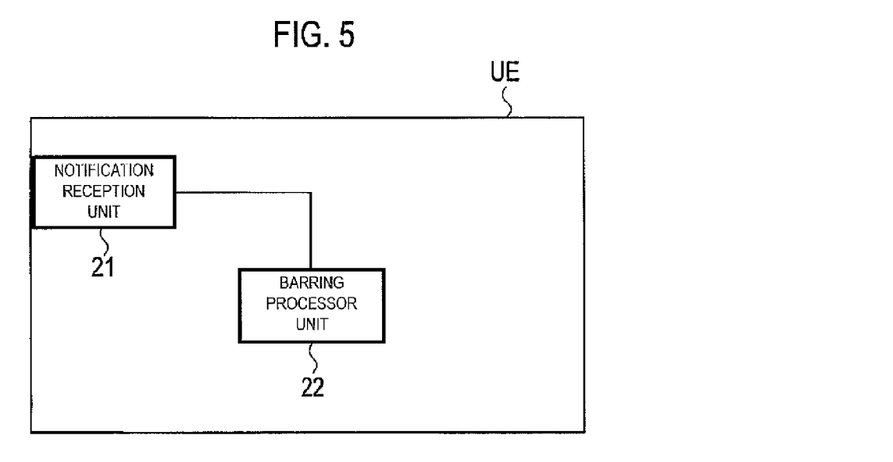
FIG. 5 is a functional block diagram of a mobile station according to the first embodiment of the present invention.

As shown in FIG. 5, the mobile station UE includes a notification reception unit 21 and a barring processor unit 22.

The mobile station UE can support LTE Release-10 and is configured to be capable of performing CS communications through UTRAN/GERAN while being in E-UTRAN using the CSFB function.

The notification reception unit 21 is configured to receive notification such as an MIB and an SIB in E-UTRAN.

The barring processor unit 22 is configured to perform predetermined baring processing in E-UTRAN based on an information element for barring included in the SIB2 received by the notification reception unit 21.

For example, the barring processor unit 22 is configured to perform barring processing for the origination of the CS call using the CSFB function based on "ac-BarringForCSFB-r10" and "ac-BarringForMO-Data" among the information elements.

The barring processor unit 22 may be configured as follows. Specifically, the barring processor unit 22 may perform the barring processing for the CS call using the CSFB function based on "ac-BarringForCSFB-r10" when the SIB2 includes "ac-BarringForCSFB-r10". The barring processor unit 22 may perform the barring processing for the origination of the CS call using the CSFB function based on "ac-BarringForMO-Data", when the SIB2 does not include "ac-BarringForCSFB-r10" but includes "ac-BarringForMO-Data".

The mobile station UE that cannot support LTE Release-10 cannot understand received "ac-BarringForCSFB-r10" included in the SIB2, and thus cannot perform the processing for barring the origination of the CS call using the CDFB function. Still, the mobile station UE that cannot support LTE Release-10 can receive "ac-BarringForEmergency" and "ac-BarringForMO-Signalling", and "ac-BarringForMO-Data" included in the SIB2, and thus can perform the processing for barring the origination of the emergency call, the signaling call, and the normal PS call, as in the conventional case.

An example of an operation of the mobile station UE according to the first embodiment of the present invention, that is, the mobile station UE that can support LTE Release-10 is described below with reference to FIG. 6.

Figure 6:
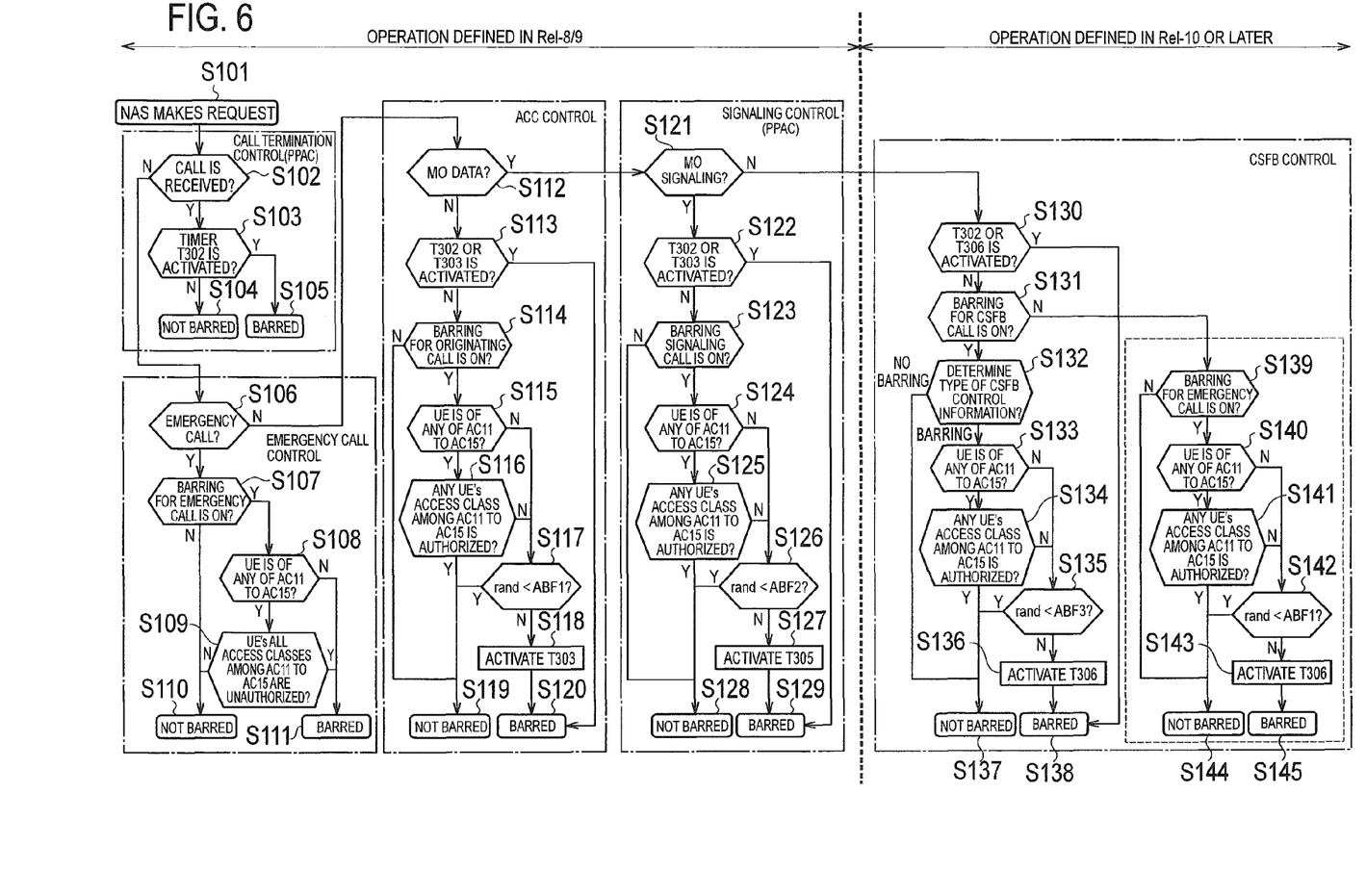
FIG. 6 is a flowchart for describing an operation of the mobile station according to the first embodiment of the present invention.

As shown in FIG. 6, when an origination request is received from a NAS (Non Access Stratum) function in Step S101, an AS (Access Stratum) function of the mobile station UE determines whether the origination request is that triggered by a terminating signal (paging signal) in Step S102.

The operation proceeds to Step S103 if it is determined to be "Yes" in Step S102, and the operation proceeds to Step S106 if it is determined to be "No" in Step S102.

In Step S103, the AS function of the mobile station UE determines whether a timer T302 is active.

The timer T302 is set based on a value notified through "RRC Connection Reject" from the radio base station eNB.

The operation proceeds to Step S105 if it is determined to be "Yes" in Step S103, and the operation proceeds to Step S104 if it is determined to be "No" in Step S103.

The AS function of the mobile station UE determines to bar the origination triggered by the paging signal in Step S104 and determines not to bar the origination triggered by the paging signal in Step S105.

In Step S106, the AS function of the mobile station UE determines whether the origination request from the NAS function is the request for originating the emergency call.

The operation proceeds to Step S107 if it is determined to be "Yes" in Step S106, and the operation proceeds to Step S112 if it is determined to be "No" in Step S106.

In Step S107, the AS function of the mobile station UE determines whether it is set in "ac-BarringForEmergency" in the SIB2 that the origination of the emergency call is to be barred.

The operation proceeds to Step S108 if it is determined to be "Yes" in Step S107, and the operation proceeds to Step S110 if it is determined to be "No" in Step S107.

In Step S108, the AS function of the mobile station UE determines whether the access class of the mobile station UE is any one of "AC11" to "AC15".

The operation proceeds to Step S109 if it is determined to be "Yes" in Step S108, and the operation proceeds to Step S111 if it is determined to be "No" in Step S108.

In Step S109, the AS function of the mobile station UE determines whether the access is unauthorized for all the corresponding access classes (AC11 to AC15) of the mobile station UE by referring to "ac-BarringForEmergency".

The operation proceeds to Step S111 if it is determined to be "Yes" in Step S109, and the operation proceeds to Step S110 if it is determined to be "No" in Step S109.

The AS function of the mobile station UE determines not to bar the origination of the emergency call in Step S110 and determines to bar the origination of the emergency call in Step S111.

In Step S112 the AS function of the mobile station UE determines whether the origination request from the NAS function is a request for originating the normal PS call.

The operation proceeds to Step S113 if it is determined to be "Yes" in Step S112, and the operation proceeds to Step S121 if it is determined to be "No" in Step S112.

In Step S113, the AS function of the mobile station UE determines whether the timer T302 or a timer T303 is active.

The operation proceeds to Step S120 if it is determined to be "Yes" in Step S113, and the operation proceeds to Step S114 if it is determined to be "No" in Step S113.

In Step S114, the AS function of the mobile station UE determines whether "ac-BarringForMO-Data" included in the SIB2 is set.

The operation proceeds to Step S115 if it is determined to be "Yes" in Step S114, and the operation proceeds to Step S119 if it is determined to be "No" in Step S114.

In Step S115, the AS function of the mobile station UE determines whether the access class of the mobile station is any one of "AC11" to "AC15".

The operation proceeds to Step S116 if it is determined to be "Yes" in Step S115, and the operation proceeds to Step S117 if it is determined to be "No" in Step S115.

In Step S116, the AS function of the mobile station UE determines whether the access is authorized for of the access class (any one of AC11 to AC15) of the mobile station UE by referring to "ac-BarringForSpecialAC" in "ac-Barring-ForMO-Data".

The operation proceeds to Step S117 if it is determined to be "No" in Step S116, and the operation proceeds to Step S119 if it is determined to be "Yes" in Step S116.

In Step S117, the AS function of the mobile station UE determines whether a random number rand generated in the mobile station UE is smaller than a value ABF1 set in "ac-BarringFactor" in "ac-BarringForMO-Data".

The operation proceeds to Step S119 if it is determined to be "Yes" in Step S117, and the operation proceeds to Step S118 if it is determined to be "No" in Step S117.

In Step S118, the AS function of the mobile station UE activates the timer T303. For example, the AS function of the mobile station UE sets the timer T303 to a value obtained by "(0.7+0.6×rand)×(the value set in "ac-BarringTime" in "ac-BarringForMO-Data")".

The AS function of the mobile station UE determines not to bar the origination of the normal PS call in Step S119, and determines to bar the origination of the normal PS call in Step S120.

In Step S121, the AS function of the mobile station UE determines whether the origination request from the NAS function is a request for originating the signaling call.

The operation proceeds to Step S122 if it is determined to be "Yes" in Step S121, and the operation proceeds to Step S130 if it is determined to be "No" in Step S121.

In Step S122, the AS function of the mobile station UE determines whether the timer T302 or the timer T303 is active.

The operation proceeds to Step S129 if it is determined to be "Yes" in Step S122, and the operation proceeds to Step S123 if it is determined to be "No" in Step S122.

In Step S123, the AS function of the mobile station UE determines whether "ac-BarringForMO-Signalling" in the SIB2 is set.

The operation proceeds to Step S124 if it is determined to be "Yes" in Step S123, and the operation proceeds to Step S128 if it is determined to be "No" in Step S123.

In Step S124, the AS function of the mobile station UE determines whether the access class of the mobile station UE is any one of "AC11" to "AC15".

The operation proceeds to Step S125 if it is determined to be "Yes" in Step S124, and the operation proceeds to Step S126 if it is determined to be "No" in Step S124.

In Step S125, the AS function of the mobile station UE determines whether the access is authorized for the access class (any of AC11 to AC 15) of the mobile station UE by referring to "ac-BarringForSpecialAC" in "ac-Barring-ForMO-Signalling".

The operation proceeds to Step S126 if it is determined to be "No" in Step S125, and the operation proceeds to Step S128 if it is determined to be "Yes" in Step S125.

In Step S126, the AS function of the mobile station UE determines whether the random number rand generated in the mobile station UE is smaller than a value ABF2 set in "ac-BarringFactor" in "ac-BarringForMO-Signalling".

The operation proceeds to Step S128 if it is determined to be "Yes" in Step S126, and the operation proceeds to Step S127 if it is determined to be "No" in Step S126.

In Step S127, the AS function of the mobile station UE activates a timer T305. For example, the AS function of the mobile station UE sets the timer T305 to a value obtained by "(0.7+0.6×rand)×(the value set in "ac-BarringForMO-Signalling")".

The AS function of the mobile station UE determines not to bar the origination of the signaling call in Step S128, and determines to bar the origination of the signaling call in Step S129.

In Step 130, the AS function of the mobile station UE determines whether the timer T302 or a timer T306 is active.

The operation proceeds to Step S138 if it is determined to be "Yes" in Step S130, and the operation proceeds to Step S131 if it is determined to be "No" in Step S130.

In Step S131, the AS function of the mobile station UE determines whether "ac-BarringForCSFB-r10" included in the SIB2 is set.

The operation proceeds to Step S132 if it is determined to be "Yes" in Step S131, and the operation proceeds to Step S139 if it is determined to be "No" in Step S131.

In Step S132, the AS function of the mobile station UE determines whether "barring" is set in "AC-BarringForCSFB-r10" in "ac-BarringForCSFB-r10" in the SIB2.

For example, the operation proceeds to Step S133 when it is determined that "barring" is set in "AC-BarringForCSFB-r10" in "ac-BarringForCSFB-r10" in Step S132, and proceeds to Step S137 when it is determined that "no barring" is set in "AC-BarringForCSFB-r10" in "ac-BarringForCSFB-r10" in Step S132.

Alternatively, the operation proceeds to Step S133 when it is determined that "barring" is set in "AC-BarringForCSFB-r10" in "ac-BarringForCSFB-r10" in Step S132, and proceeds to Step S137 when it is determined that nothing is set in "AC-BarringForCSFB-r10" in "ac-BarringForCSFB-r10" in Step S132.

In Step S133, the AS function of the mobile station UE determines whether the access class of the mobile station UE is any one of "AC11" to "AC15".

The operation proceeds to Step S134 if it is determined to be "Yes" in Step S133, and the operation proceeds to Step S135 if it is determined to be "No" in Step S133.

In Step S134, the AS function of the mobile station UE determines whether the access is authorized for the access class (any one of AC11 to AC15) of the mobile station UE by referring to "ac-BarringForCSFB-r10" in "ac-Barring-ForMO-Signalling".

The operation proceeds to Step S137 if it is determined to be "No" in Step S134, and the operation proceeds to Step S135 if it is determined to be "Yes" in Step S134.

In Step S135, the AS function of the mobile station UE determines whether the random number rand generated in the mobile station UE is smaller than a value ABF 3 set in "ac-BarringFactor" in "ac-BarringForCSFB-r10".

The operation proceeds to Step S137 if it is determined to be "Yes" in Step S135, and the operation proceeds to Step S136 if it is determined to be "No" in Step S135.

In Step S136, the AS function of the mobile station UE activates the timer T306. For example, the AS function of the mobile station UE sets the timer T306 to a value obtained by "(0.7+0.6×rand)×(the value set in "ac-BarringTime" in "ac-BarringForMO-Data")" in the timer T306.

The AS function of the mobile station UE determines not to bar the origination of the CS call using the CSFB function in Step S137, and determines to bar the origination of the CS call using the CSFB function in Step S138.

In Step S139, the AS function of the mobile station UE determines whether "ac-BarringForMO-Data" included in the SIB2 is set.

The operation proceeds to Step S140 if it is determined to be "Yes" in Step S139, and the operation proceeds to Step S144 if it is determined to be "No" in Step S139.

In Step S140, the AS function of the mobile station UE determines whether the access class of the mobile station UE is any one of "AC11" to "AC15".

The operation proceeds to Step S141 if it is determined to be "Yes" in Step S140, and the operation proceeds to Step S142 if it is determined to be "No" in Step S140.

In Step S141, the AS function of the mobile station UE determines whether the access is authorized for the access class (any one of AC11 to AC15) of the mobile station UE by referring to "ac-BarringForSpecialAC" in "ac-Barring-ForMO-Data".

The operation proceeds to Step S144 if it is determined to be "No" in Step S141, and the operation proceeds to Step S142 if it is determined to be "Yes" in Step S141.

In Step S142, the AS function of the mobile station UE determines whether the random number rand generated in the mobile station UE is smaller than the value ABF1 set in "ac-BarringFactor" in "ac-BarringForMO-Data".

The operation proceeds to Step S144 if it is determined to be "Yes" in Step S142, and the operation proceeds to Step S143 if it is determined to be "No" in Step S142.

In Step S143, the AS function of the mobile station UE activates the timer T306. For example, the AS function of the mobile station UE sets the timer T306 to a value obtained by "(0.7+0.6×rand)×(the value set in "ac-BarringTime" in "ac-BarringForMO-Data")".

The AS function of the mobile station UE determines not to bar the origination of the CS call using the CSFB function in Step S144, and determines to bar the origination of the CS call using the CSFB function in Step S145.

In the mobile communication system according to the first embodiment of the present invention, the CS call using the CSFB component can be barred using "ac-BarringForCSFB-r10", which is an information element receivable by a mobile station UE that can support LTE Release-10.

Features of the embodiment described above may be described as follows.

The first feature of the embodiment is summarized in that a mobile station UE configured to be capable of performing circuit switching communications using a CSFB function (circuit switching fallback function) through UTRAN/GE-RAN (a second radio access network that supports packet switching and circuit switching) while the mobile station UE is in E-UTRAN (a first radio access network that supports the packet switching but does not support the circuit switching), the mobile station UE including: a notification reception unit 21 configured to receive SIB2 (notification) in E-UTRAN; and a barring processor unit 22 configured to perform predetermined barring processing in E-UTRAN based on information elements included in the SIB2. The barring processor unit 22 is configured to perform barring processing for origination of a CS call using the CSFB function based on "ac-BarringForCSFB-r10 (a first information element for barring an origination of a circuit switching call using the CSFB function)" and "ac-BarringForMO-Data (a second information element for barring an origination of a normal packet switching call)" among the information elements.

In the first feature, the barring processor unit 22 may be configured to perform barring processing for the origination of the CS call using the CSFB function based on "ac-BarringForCSFB-r10" if the SIB2 includes "ac-BarringForCSFB-r10", and the barring processor unit may be configured to perform barring processing for the origination of the CS call using the CSFB function based on "ac-BarringForMO-Data" if the SIB2 does not include "ac-BarringForCSFB-r10" but includes "ac-BarringForMO-Data".

In the first feature, the barring processor unit 22 may be configured to perform barring processing for the origination of the CS call using the CSFB function if "barring" is set in "ac-BarringForCSFB-r10", and the barring processor unit may be configured not to perform barring processing for the origination of the CS call using the CSFB function if "no-barring" is set in "ac-BarringForCSFB-r10" or nothing is set in "ac-BarringForCSFB-r10".

The second feature of the embodiment is summarized in that a radio base station eNB in E-UTRAN in a mobile communication system configured such that a mobile station UE in E-UTRAN is is capable of performing circuit switching communications using a CSFB function through UTRAN, the radio base station eNB including: a notification transmission unit 12 configured to transmit an SIB2. The notification transmission unit 12 is configured to include in the SIB2, "ac-BarringForEmergency (information element for barring an origination of an emergency call) ac-BarringForMO-Data", "ac-BarringForMO-Signalling (information element for barring an origination of a signaling call)", and "ac-BarringForMO-Data (information element for barring an origination of a normal packet switching call)", as information elements receivable by a mobile station UE supporting Release-8/9 (first release). The notification transmission unit 12 is configured to include, in the SIB2, "ac-BarringForCSFB-r10 (an information element for barring a circuit switching call using the circuit switching fallback function)" as an information element receivable by a mobile station UE supporting Release-10 (a second release) newer than Release 8/9.

Note that an operation of the radio base station eNB and the mobile station UE 10 may be implemented by hardware or may be implemented by a software module to be executed by a processor, or may be implemented in combination of the both.

The software module may be provided in any form of a recording medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such recording medium is connected with a processor so that the processor can read and write information on the recording medium. Also, such recording medium may be integrated on the processor. Instead, such recording medium and the processor may be provided inside ASIC. Such ASIC may be provided inside the radio base station eNB and the mobile station UE. Alternatively such recording medium and the processor may be provided as discrete components inside the radio base station eNB and the mobile station UE.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile station, comprising:
a notification reception unit configured to receive notification in a first radio access network, the mobile station being configured to be capable of performing circuit switching communications using a circuit switching fallback function through a second radio access network that supports packet switching and circuit switching while the mobile station is in the first radio access network that supports the packet switching but does not support the circuit switching; and
a barring processor unit configured to perform predetermined barring processing in the first radio access network based on information elements included in the notification, wherein
the barring processor unit is configured to perform barring processing for origination of a circuit switching call from the mobile station using the circuit switching fallback function based on a first information element for barring an origination of a circuit switching call from the mobile station using the circuit switching fallback function and a second information element for barring an origination of a normal packet switching call from the mobile station among the information elements.

2. The mobile station according to claim 1, wherein
the barring processor unit is configured to perform barring processing for the origination of the circuit switching call from the mobile station using the circuit switching fallback function based on the first information element if the notification includes the first information element, and
the barring processor unit is configured to perform barring processing for the origination of the circuit switching call from the mobile station using the circuit switching fallback function based on the second information element if the notification does not include the first information element but includes the second information element.

* * * * *